United States Patent [19]

Kugelman et al.

[11] Patent Number: 4,814,931
[45] Date of Patent: Mar. 21, 1989

[54] APPARATUS AND METHOD FOR TIMED-DE-ICING

[75] Inventors: Michael M. Kugelman; James M. Roman, both of Akron, Ohio

[73] Assignee: The B. F. Goodrich Company, Akron, Ohio

[21] Appl. No.: 191,728

[22] Filed: May 6, 1988

Related U.S. Application Data

[63] Continuation-in-part of Ser. No. 3,673, Jan. 15, 1987, abandoned.

[51] Int. Cl.[4] .............................................. H02H 9/00
[52] U.S. Cl. ........................................ 361/56; 361/60;
361/86; 361/91; 361/98; 219/483; 219/497;
323/269; 323/272; 323/276; 244/134 D
[58] Field of Search .................... 361/56, 54, 60, 75,
361/74, 71, 86, 91, 100, 88, 57; 363/50, 51;
323/267, 269, 272, 277, 276; 244/134 D, 134 R

[56] References Cited

U.S. PATENT DOCUMENTS

| | | | |
|---|---|---|---|
| 3,303,388 | 2/1967 | Means | 317/33 |
| 3,603,843 | 9/1971 | Clements | 317/33 |
| 3,654,518 | 9/1971 | Phelps et al. | 361/101 |
| 3,792,289 | 7/1972 | Kazem | 361/100 |
| 3,879,652 | 4/1975 | Billings | 361/100 |
| 3,924,159 | 12/1975 | Hoover | 317/33 |
| 3,944,888 | 3/1976 | Clark | 361/100 |
| 4,090,227 | 5/1978 | Schweitzer | 361/57 |
| 4,135,223 | 1/1979 | Holmes | 361/56 |
| 4,150,413 | 4/1979 | Nerem | 361/92 X |
| 4,204,148 | 5/1980 | Gaertner | 323/22 |
| 4,292,502 | 9/1981 | Adams | 219/483 |
| 4,336,563 | 6/1982 | Suzuki | 361/93 |
| 4,363,064 | 12/1982 | Billings et al. | 361/100 |
| 4,376,968 | 3/1983 | Wueschinski et al. | 323/243 X |
| 4,453,193 | 6/1984 | Huang et al. | 361/98 |
| 4,638,960 | 1/1987 | Straube et al. | 219/497 X |

Primary Examiner—Gerald P. Tolin
Assistant Examiner—Todd E. DeBoer
Attorney, Agent, or Firm—David M. Ronyak; Woodrow W. Ban

[57] ABSTRACT

An all solid state timer-controller for the timed, sequential application of electrical current to loads within a circuit at high amperage, the circuit finding utility in the application of electrical current to de-icers employed aboard aircraft.

37 Claims, 2 Drawing Sheets

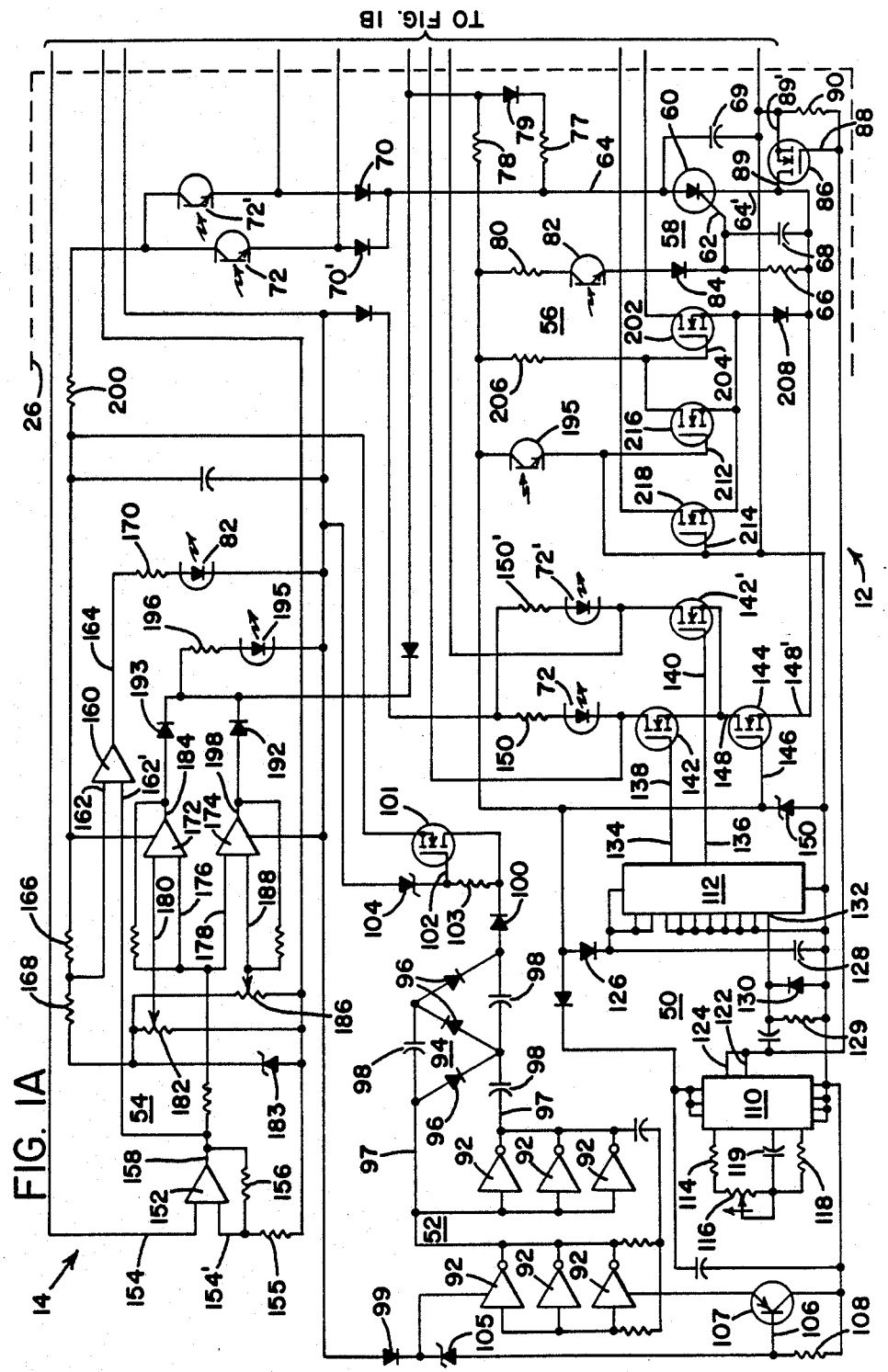

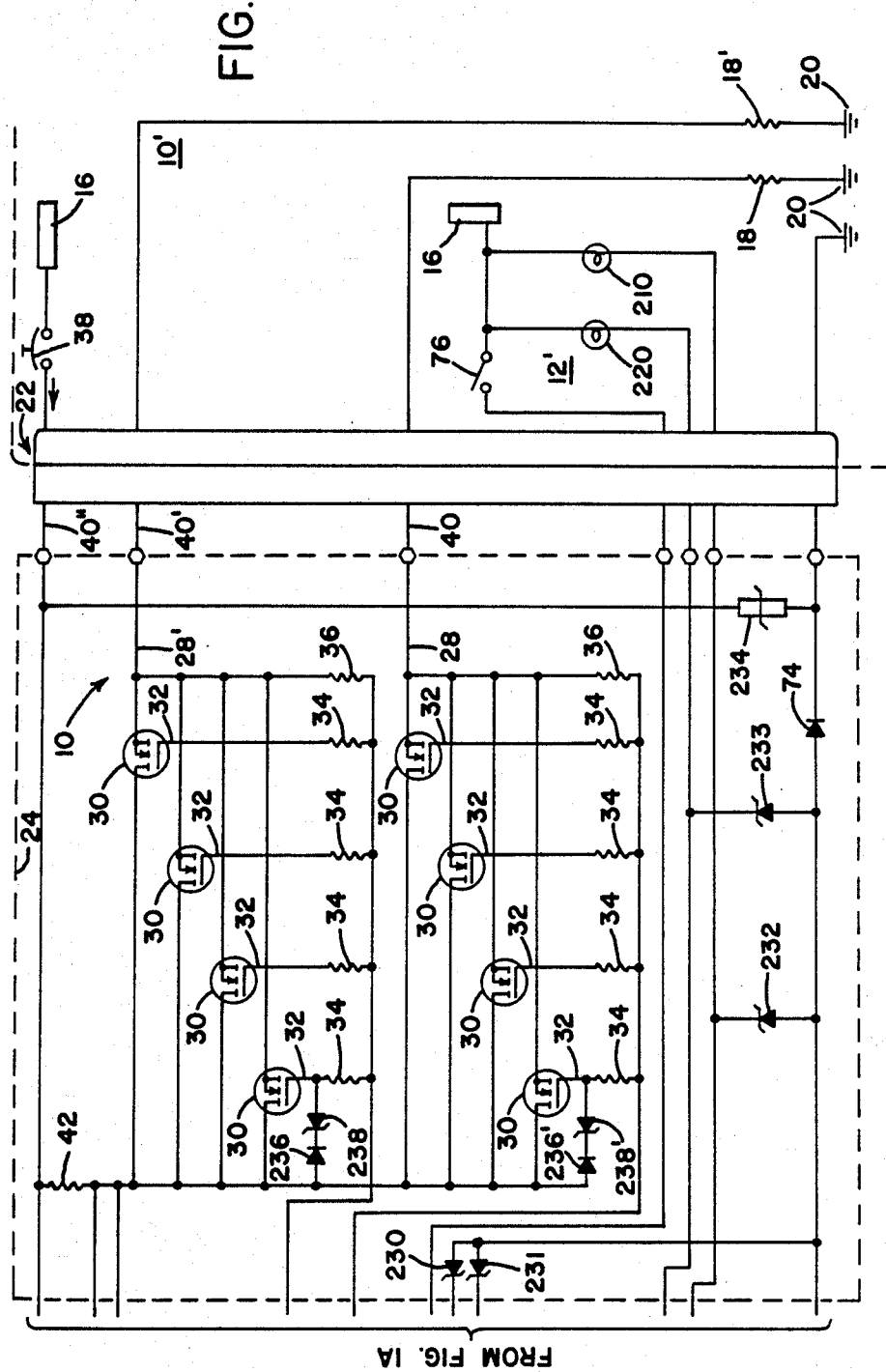

APPARATUS AND METHOD FOR TIMED-DE-ICING

This is a continuation-in-part of application Ser. No. 07/003,673, field Jan. 15, 1987 now abandoned.

FIELD OF THE INVENTION

This invention relates to sequencing control timers typically finding use in applying electrical current sequentially to loads within a circuit for desired time Periods. More Particularly, this invention relates to solid state sequencer controllers finding utility in the sequenced application of electrical current for desired time periods to electrothermal de-icers utilized in preventing or removing ice accretions from ice accreting surfaces such as aircraft airfoils.

BACKGROUND OF THE INVENTION

Structures for either removing ice accretions from surfaces or preventing the accretion of ice on suseptible surfaces such as those associated with wings, tail surfaces, and struts of aircraft are well known. Where such devices prevent the accumulation of ice the devices are called anti-icers.

Where such devices periodically remove ice accumulations, the devices are frequently referred to as de-icers.

Anti-icers typically include two basic approaches, one approach being the introduction on to the surface of a fluid having an inherent property of suppressing the formation of ice; the second being the heating of an ice accreting surface to maintain a continuous surface temperature sufficiently elevated to foreclose the formation of ice thereover. For de-icers, de-icing methods typically fall into one of three categories, one being the introduction of a fluid beneath ice accumulations upon the ice accreting surface to weaken the bond between the surface and the ice thereby allowing the force of fluid such as air moving over the surface to remove the ice; the second being the heating of the surface periodically to weaken the bond between the surface and the ice to allow removal by the airstream; the third being periodic distortion of the ice accreting surface by inflating, for example, a Pneumatic de-icer applied thereover.

With respect to thermal means for anti-icing or de-icing ice accreting surfaces, heating is typically accomplished by either the use of electrothermal pads applied over or immediately beneath an ice accreting surface or by the introduction beneath the ice accreting surface of a fluid, such as gases drawn from a compressor stage of a turbine engine, sufficiently elevated in temperature to provide a desired anti-icing or de-icing function. Where anti-icing is to be accomplished, typically any source of heat employed in effecting anti-icing is operated in a continuous manner. So, electrothermal pads employed for anti-icing are generally activated continuously during those time periods wherein anti-icing capability is desired.

Conversely, for de-icing capability, electrothermal pads are typically operated intermittently. Intermittent operation is desirable in part because of the weight and power consumption characteristics of electrical generating equipment necessary for the operation of electrothermal de-icing pads. By operating such pads for timed periods only, and sequencing the operation of such pads so that relatively few are operating during any particular time period, the size and power drain associated with electrical generating equipment sufficient to support electrothermal de-icing is significantly reduced.

In order that electrothermal de-icing pads be operated in an orderly, sequenced fashion, each for a desired time period, it has been necessary to provide timer-sequencers operably connected to the de-icer pads and a source of electrical current employed in operating the de-icer pads configured to sequence properly application of electrical current to electrothermal pads. Typically, such timer-sequencers or timer controllers have included an electro-mechanical device configured to apply sequentially, electrical current for desired time periods to various electrothermal de-icing pads aboard an aircraft. These de-icer pads represent in such application electrical loads within a load circuit that begins with a source of electrical current and ends at a point of low reference voltage by which the electrical current flow returns to the source of electrical current after passing through the loads.

In electro-mechanical timer-controllers, the current flowing to a particular load flows through the timer-controller via contacts within the mechanical sequencing device. The electro-mechanical sequencing device or timer conroller, by reason of the large current flows therethrough, must by necessity include contacts having a relatively elevated surface area and configured to transfer large electrical currents flowing to the loads through the mechanical sequencer. As a consequence, these electro-mechanical sequencers typically require powerful electrical activators configured to effect changes typically by means of rotation of contacts within the electro-mechanical sequencer, necessary to overcome frictional interference between engaging contacts within the electro-mechanical sequencer. These large electrical actuators for such electro-mechanical sequencers coupled with a fairly bulky physical configuration for such sequencers by dint of the presence of relatively large, electrically conductive current transferring contacts within the sequencer tends to make such electro-mechanical timer-controllers heavy. With weight being at a premium on most aircraft, it is desirable that weight associated with timer-controllers be reduced to the extent possible.

Equally, movement of any electro-mechanical sequencer in such timer-controllers has traditionally been dictated by a mechanical clock activating the electrical actuator typically to rotate contacts within the electro-mechanical timer sequencer to the next sequence position. Such clocks also have tended to be bulky and, fairly heavy, and accordingly, a timer-controller effective in reducing the weight and bulk required for such clock mechanisms could find substantial utility in the manufacture of timer-controllers for use in aircraft de-icing systems.

Traditionally, timer-controllers have utilized one or more ammeters to inform operating personnel of an aircraft employing a timer-controller for controlling sequential de-icing processes as to the quantity of electrical current flowing to any particular de-icer during sequenced operation. Aircraft operating personnel by necessity were required to observe the ammeter to assure that malfunctions within one or more of the de-icing pads was not causing a disruption in de-icing function. Observation of a low or a particularly elevated electrical current flow based on ammeter readings would be an indication to the aircraft operator that the de-icing function was not as desired with respect to one or more de-icing pad.

Pilots, however, in operating aircraft have a large number of activities to accomplish. Accordingly, systems that Provide a go/no-go indication with respect to various functions aboard an aircraft have gained popularity. Particulary with respect to de-icers, a go/no-go indication employing, for example, red and green lights, could find substantial utility in the manufacture of de-icing systems for aircraft.

SUMMARY OF THE INVENTION

The present invention provides a timer-controller for timed, where desired sequential, application of electrical current to one or more individual loads. The timer-controller includes a load circuit configured to transfer electrical current from a source through individual loads. In the load circuit at least one solid state switching means, preferably a Field Effect Transistor, is provided associated with each individual load within the load circuit. A control circuit is included configured to cause application of the electrical current through the load circuit.

The control circuit includes a means configured for detecting a relative magnitude of electrical current flowing to a particular individual load while electrical current is applied thereto, also configured for comparing the detected magnitude against a desired magnitude and further configured to provide an electrical indication functionally arranged to initiate a termination of electrical flow to the particular individual load where the magnitude of the electrical current flow associated with the particular individual load undesirably deviates from the desired magnitude. The control circuit further includes a solid state crow-bar means including a resetting means configured to terminate a flow of electrical current to a particular individual load in response to the initiating of the electrical indication. The timer-controller further includes a solid state timing means within the control circuit configured for activating the solid state switching means to apply the electrical current sequentially to individual loads for a desired period of time.

In preferred embodiments of the invention the load circuit and the control circuit are operably joined by solid conductors in lieu of stranded wire conductors. Additionally, where solid state components used or utilized within the timer-controller are susceptible to externally generated voltage transients that may occur at any time, whether the timer-controller is in operation or not, at least one of the circuits includes a transient over voltage protection means. These protection means may in preferred embodiments either clip these transients or may pass them to load.

The detecting means preferably includes a means for introducing a voltage differential in the load circuit separate from any voltage differential caused directly by passage of the current through a component of the circuit not comprising the load, amplifier means configured to respond to and amplify this voltage differential, comparative means configured to compare the amplified voltage differential provided by the amplifier means to an upper limitation thereon and to provide the initiating electrical indication to the crow-bar means while the amplified voltage differential falls above the upper limitation. Equally preferably, the crow-bar means includes a solid state switching conductor having a sensing electrode and configured to drain in a latching manner activating electrical signals from sensing electrodes of the solid state switching means employed in the timer-controller load circuit and further configured to be activated by application of the initiating electrical indication supplied by the detecting means to the sensing electrode of the solid state switching conductor, all together with a means for resetting the crow-bar means.

In preferred embodiments of the timer-controller, the solid state timing means includes a solid state oscillator timer and a solid state sequencer with the oscillator timer being configured to generate electrical timing signals and the sequencer being operably connected and configured to respond to the electrical timing signals and to sequence the application of electrical current to each solid state switching means for desired periods of time. Additionally, the timer-controller preferably includes a means to activate visual indication of the operating status of either the load or the control circuits. In preferred embodiments this visual indication is a so-called idiot light.

In further preferred embodiments, the timer-controller includes a source of current at elevated voltage, preferably a DC-DC converter, configured and operably connected to provide a desired current flow at a voltage in excess of the voltage supply available to the load circuit, together with a pair of comparators. One of the comparators is configured and operably connected to compare the amplified voltage differential to an upper voltage limitation and where the amplified voltage differential exceeds the upper voltage limitation, the comparator is configured and operably connected to activate a visual signal. The remaining comparator is configured and operably connected to compare the amplified voltage differential to a lower voltage limitation, and where the amplified voltage differential does not exceed the lower voltage limitation, this remaining comparator is configured and operably connected to provide a visual signal. The source of electrical current at an elevated voltage is operably supplied to at least one of the comparators.

Preferably operable joinder between comparators within the timer-controller and other functioning devices such as the crow-bar means or the visual signals within the timer-controller is accomplished employing optical couplers.

In preferred embodiments, the individual loads within the load circuit are electrothermal de-icing pads.

The present invention provides a method for application of electrical current sequentially to individual loads within a load circuit where the load circuit is configured to collect electrical current from a source and to apply the electrical current to individual loads, with operation of the load circuit further being controlled by a control circuit configured and operably connected to cause application of electrical current through the load circuit. The source of electrical current and the individual loads within the circuit are operably connected employing at least one solid state switching means associated with each individual load within the load circuit.

A magnitude of electrical current flowing to individual loads while electrical current is applied thereto is detected and the detected magnitude is compared against a desired magnitude. Where the magnitude of electrical current flow associated with the particular individual load undesirably deviates from the desired magnitude, an initiating electrical indication is provided to initiate a termination of electrical current flow to a particular individual load. A solid state crow-bar means is employed to crow-baringly terminate a flow of electrical current through the particular individual load in response to the initiating electrical indication. The crow-bar function is periodically reset.

Electrical current is applied to each individual load in sequence within the load circuit through the solid state switching means for desired time period. Preferably transients within either the load circuit or the control circuit are clipped or otherwise handled in the practice of the invention to prevent damage to susceptible electrical components of the circuits.

Preferably the voltage differential in the load circuit is introduced separate and apart from any voltage differential associated with the individual loads within the load circuit and this voltage differential is amplified and compared to an upper limitation thereon. An initiating electrical indication is provided to the crow-bar means if the amplified voltage differential falls above the desired limitation. Preferably, in the practice of the invention, the crow-bar means is employed to latchingly drain from sensing electrodes of the solid state switching means activating electrical signals employed for activating particular solid state switching means to conduct electrical current to a particular individual load. In preferred modes of the invention, the initiating electrical indication is optically coupled in providing the initiating electrical indication to the crow-bar means. In the method of the invention it is preferable that a visual indication of the operating status of at least one of the load and control circuits is provided.

The above and other features and advantages of the invention will become more apparent when considered in light of a description of a preferred embodiment together with drawings which follow forming a part of the specification.

DESCRIPTION OF THE DRAWINGS

FIGS. 1A and B constitute an electrical schematic of a timer-controller made in accordance with the invention.

BEST EMBODIMENT OF THE INVENTION

Referring to the drawing, FIG. 1 depicts a load circuit 10 together with a control circuit 12 forming a timer-controller 14 configured to transferringly apply electrical current available at a source of direct current (DC) voltage 16 to a plurality of loads 18, 18' and thereafter to a point of low reference voltage 20 depicted in FIG. 1 as ground. A junction block 22 separates portions of the load circuit 10' and portions of the control circuit 12' wired upon an aircraft or other device employing the timer-controller 14 from remaining portions of the circuits 10, 12 contained within a timer-controller 14 aboard an aircraft. The timer-controller 14 in this best embodiment is a two-circuit board apparatus, the portions 10 of the load circuit contained within the timer-controller being placed upon a so-called power board 24; portions of the control circuit 12 contained within the timer-controller 14 are configured aboard a so-called control board 26. These boards 24, 26 can be of any suitable or conventional nature but typically are formed of a suitable plastic material having foil circuit pathways thereon and hole therethrough through which holes components of the circuits 10, 12 are positioned and fastened in electrically conducting relationship to the foils. Formation of circuit boards and fastening of components thereto in an operable manner in fabricating electronic devices is well-known.

The load circuit 10, 10' both internal to and external to the timer-controller 14 includes a plurality of branch pathways 28, 28' configured to conduct electrical current to the loads 18, 18'. Each branch 28, 28' includes one or more solid state switching means 30; each solid state switching means 30 includes a sensing electrode 32. A plurality of resistors 34 are provided and operably connected to assure against undesired oscillations of the solid state switching means 30. Pull-down resistors 36 are provided and operably connected to drain electrical signals available at the sensing electrodes 32 with the passage of time. The Pull-down resistors 36 are provided specifically to drain signals from the sensing electrodes 32 after shutdown of the load circuit 10. The sizing and selection of pull-down resistors to perform the function of the resistors 34, 36 is well-known in the art of circuitry design.

A manual circuit breaker 38 optionally can be included in the load circuit 10. It should be apparent that the manual circuit breaker 38 can be fuse, or suitable or conventional resetting-type or non-resetting-type circuit breaker.

Electrical interconnections 40, 40', 40" are provided between the junction block 22 and the power circuit board 24 and preferably are made with and from solid conductor as distinguished from stranded conductor or foil conductors on circuit boards. While it typically has been found in vibration prone service such as is associated with piston aircraft, that flexible stranded wire is desirable for making such connections and that solid connectors tend to undergo early brittle fracture, it has been found in the configuration of the present invention that solid conductors such as solid wire or busses in combination with solid wire can be utilized to effect the connections 40, 40', 40" while providing quite satisfactory service lives. Surprisingly in the timer-controller of the invention using solid conductors simplifies the construction and helps stiffen the assembly for vibration resistance.

A shunt 42 is present in the load circuit 10. The shunt 42 is configured to induce a voltage differential in the load circuit associated with the shunt. The voltage differential associated with the shunt is separate and apart from any voltage differential arising in the load circuit 10 by reason of electrical current flow through component elements of the loads 18, 18' and is proportioned to the electrical current flowing through the lead circuit 10. The shunt 42 should Preferably be made of a material that has a low temperature coefficient of resistance so that is has a relatively constant resistance value over a wide temperature range.

The solid state current switching means 30 can be any suitable or conventional device configured to establish an electrical pathway for the conduction of electrical current through the switching means 30 upon the application of a particular electrical signal, that is an activating electrical signal, to the sensing electrodes 32. Such devices are well-known in the art of circuit design and, for example, may be field effect transistors (FET). Preferably the solid state current transferring means 30 are not latching type devices, that is the means 30 are not current transfering means that remain in a current transfering or "on" state after the removal of the activating electrical signal from the sensing electrodes 32.

The control circuit 12 includes a DC-DC converter timer-sequencer portion 50, a portion 52, a comparator section 54, and an interlock section 56.

The interlock section 56 includes a crow-bar means 58. The crow-bar means 58 functions to drain electrical current from sensing electrodes 32 of the solid state current transferring means 30 in the event that it is desired that current flow therethrough should be terminated to protect circuitry. The crow-bar means 58 includes a solid state current switching device 60, having a sensing electrode 62. The solid state switching device 60 includes current conducting electrodes 64, 64'. Upon application of an initiating electrical signal to the sensing electrode 62, the switching device 60 becomes conductive and conducts electrical current through the device 60 employing the electrodes 64, 64'. In the crow-bar means 58, a pull-down resistor 66 functions to drain initiating electrical signals from the sensing electrodes 62. A capacitor 68 functions to decouple noise at the sensing electrode 62 and a second capacitor 69 functions to supress a tendency for the switching device 60 to turn on due to transient voltage spikes. The electrode 64 is operably connected to or joined via diodes 70, 70' and the resistor 34 to the sensing electrodes 32 of the electrical current transfering means 30 in the power circuit or load circuit 10. A pair of optical couplers 72, 72' function to supply electrical current to the sensing electrodes 32 of the electrical current transfering means 30 and the electrode 64 of the solid state current switching device 60 via the diodes 70, 70'.

When the crow-bar means 58 is "turned on" by the application of the initiating electrical current to the sensing electrode 62, then the device 60 becomes conductive and drains electrical signals from the sensing electrodes 32. The electrical signals drained from the electrodes 32 proceeds to a low reference voltage, the ground 20 in FIG. 1, via a diode 74 and a switching means 86.

The source of DC power 16 is available to the control circuit 12 via a switch 76. A resistor 78 functions to assure against excessive current flow through portions of the control circuit 12. The DC voltage is available at a resistor 80. The resistor 80 functions together with the resistor 66 to define a voltage divider. An optical coupler 82 functions to draw reduced voltage from the resistor 80 and applies the reduced voltage through a diode 84 to the sensing electrode 62 while the optical coupler 82 is "turned on". Application of the voltage to sensing electrode 62 functions to turn on the switching device 60. Turning on the switching device 60 effectively crow-bars sensing electrodes 32 by removing electrical signals from the sensing electrodes 32 to turn off the devices 30 controlled by the sensing electrodes 32. A resistor 77 together with a diode 79 function to provide a level of current flow or holding current sufficient to assure that the switching device stays "latched on".

A solid state device 86 such as an FET transistor having a sensing electrode 88 and conducting electrodes 89, 89' is configured to receive a timed electrical signal at the sensing electrode 88 and establish a conductive pathway employing the conducting electrodes 89, 89' to operably join the conducting electrode 64' to the ground 20 through the diode 74. A pull-down resistor 90 is configured to drain electrical voltage from the sensing electrode 88 while the circuit 12 is quiescent.

The DC-DC converter section 52 can be of any suitable or conventional nature such as switching power supplies, fly-back converters, forward converters, off-line switching supplies, boost or buck regulators, push-pull converters or full or half-bridge converters. In this preferred embodiment the section 52 is a voltage ladder comprised of a plurality of logic inverters 92 configured to alternate between a high voltage and a low voltage state thereby generating a square wave together with a ladder 94 of diodes 96 with the rails 97 of the ladder 94 being interrupted by capacitors 98.

The DC-DC converter section 52 generates a voltage in excess of any voltage supplied thereto. In the embodiment of FIG. 1 voltage at 28 volts DC is available through a diode 99. The elevated voltage is available to the comparator section 54 via a diode 100, and an FET transistor 101 having a sensing leg 102. A resistor 103, zener diode 104 and the FET transistor 101 function to establish a voltage regulator assuring that constant voltage is available from the DC-DC converter.

An upper and lower voltage parameter for operation of the logic invertors 92 is established employing an zener diode 105. This zener diode 105 provides a voltage signal to a sensing electrode 106 of a solid state device 107 configured to establish a lower voltage for the logic invertors 92. A resistor 108 functions together with the zener diode 105 and solid state device 107 to provide essentially a regulated low reference voltage to the logic invertors 92.

The timer sequencer portion 50 includes a programmable timer or so-called oscillator-timer 110 and a solid state sequencer 112. Solid state oscillator-timers and solid state sequencers are known in the electronics art.

With respect to the timer-oscillator or programmable timer 110, a pair of resistors, that is a resistor 114 and a potentiometer 116 cooperate with a resistor 118 and capacitor 119 to provide external components necessary to allow the timer-oscillator to oscillate at a desired speed or frequency. The resistor 114, in the embodiment of FIG. 1, typically will be approximately 1,000K ohms and the potentiometer 116 will be approximately 500K ohms with the resistor 118 being approximately 2,000K ohms. The capacitor 119 is typically selected at 0.001 micro farad. The timer-oscillator 110 Produces an output available to the sequencer 112 via a pin 124. That signal is also available to the sensing leg 88 of a solid state device 86. At the sensing leg 88, the timing function signal operates to reset the crow-bar means by resetting the crow-bar solid state device 60.

A diode 126 and a capacitor 128 function to hold power to the sequencer 112 during brief discontinuities in DC power being supplied from the source 16. A resistor 129, a capacitor 137 and a diode 130 function to differentiate the signal from pin 124.

Manual actuation of the switch 76 functions to step the oscillator-timer 110 and sequencer 112 through the cycles of actuation of the load 18, 18'.

Signals available at the pin 124 of the programmable timer or oscillator-timer 110 are differentiated and available at a pin 132 of the sequencer 112. Signals received at this pin function to alternate output of the sequencer 112 between a pair of pins 134, 136. These pins 134, 136 are operably joined to sensing electrodes 138, 140 associated with solid state switching means 142, 142', typically FETs. The solid state switching devices 142, 142' function to conduct electrical current through the optical coupling devices 72, 72' to a solid state switching means 144. The solid switching means 144 passes the current from the solid state switching devices 142, 142' as long as voltage is available at a sensing electrode 146 of the solid state switching means 144. A voltage at the sensing electrode 146 is maintained employing a zener diode 150 which functions to establish a voltage at the sensing electrode 146; this voltage enables the control circuit 50 to function. A remaining electrical conducting electrode 148' associated with the solid state switching device 144 is configured to operably join via the electrode 89 the solid state switching means 86 to the means 142. Resistors 150, 150' function to limit current flow through the optical couplers 72, 72'.

In the comparator portion 54, an ampliflier 152 having high 154 and low 154' legs is provided and operably connected to the operating or load circuits 10 so that the voltage differential engendered by the shunt 42 is available across the amplifier 152. A pair of resistors 155, 156 are operably connected to the amplifier 152 to provide a gain function for the amplifier. The voltage amplifier 152 is configured to provide a multiple of the voltage differential engendered by the shunt 42 at an electrode 158 of the voltage amplifier 152. In the embodiment of FIG. 1 the voltage amplifier is an LM1245J integrated circuit or equivalent, providing a multiplication adjustable by the judicious selection of the resistors 155, 156. The voltage differential engendered by the shunt 42, if not therepriorto measurable, is thereby made measurable. By "measurable" what is meant is capable of being utilized in control of the control circuit 14.

A comparator 160 is provided having high 162 and low 162' legs and an output electrode 164. The multiplied voltage differential available at the electrode 158 is available at the electrode 162'. A voltage divider formed by resistors 166, 168 is provided to reduce voltage available from the DC-DC converter 52 via the solid state regulating device 101, and the divided voltage is available at the electrode 162 of the comparator 160. Where the multiplied voltage differential available at the electrode 162' exceeds the reduced elevated voltage available from the voltage divider between resistors 166, 168 at the electrode 162, the comparator is configured to provide an initiating electrical signal at the electrode 164.

This initiating electrical signal 164 is available at the optical coupler 82. A resistor 170 functions to protect the comparator circuit 54 against excessive current flow. When the initiating electrical signal is available at the optical coupler 82, the optical coupler 82 generates an electrical signal available at the sensing electrode 62 of the solid state switching means 60 in the interlock portion 58. Activation of the solid state means 60 effectively crowbars the electrical current flow in the load circuit 10 by dint of draining activating electrical signals from the sensing electrodes 32 of the electrical current switching means 30.

A pair of additional comparators, 172, 174 are provided in the comparator portion 54. The multiplied voltage differential available at the electrode 158 is made available at both a high side electrode 176 of the comparator 172 and a low side electrode 178 of the comparator 174. An electrode 180 of the comparator 172 is configured to receive a voltage available at a potentiometer 182 configured to receive electrical current at a voltage established by a zener diode 183. In the embodiment of FIG. 1, this voltage is approximately 6.4 volts or less. When the voltage available at the high side electrode 176 of the comparator 172 exceeds the voltage available at the low side electrode 180 of the comparator 172, the comparator provides a activating electrical signal at an electrode 184.

An additional reduced voltage signal is available at a potentiometer 186 and operably joined to a high side electrode of 188 of the comparator 174. When the voltage at the high side of the comparator 174 is not exceeded by the voltage available at the electrode 178, the comparator 174 makes an activating electrical signal available at an electrode 198. The electrodes 184, 198 are operably joined through diodes 192, 193 and are available at a light emitting diode (LED) portion of optical coupler 195. A resistor 196 functions to protect the comparator circuit 54 from excess of current flow. The comparators 172, 174 function to establish upper and lower voltage limitations between which the amplified voltage differential must lie. Where the amplified voltage differential available at the electrode 158 does not lie between the voltage limitations established by the comparators 172, 174, then the optical coupling device 195 is activated. The elevated voltage available from the DC-DC converter 94 via the solid state regulating means 101 also is made available employing a resistor 200 to detector sides of the optical couplers 72, 72' and thereby is made available at the sensing electrodes 32 to "turn on" the output solid state switching means 30.

A solid state electrical current switching means 202 is provided having a sensing electrode 204 operably configured to receive electrical current from the source of DC current 16 via a pull-up resistor 206 and resistor 78. Voltage received at the sensing electrode 204 activates the solid state switching means 202 to conduct electrical current from the source of DC current 16 through the electrical current switching means 202 and a diode 208 to a low voltage reference, ground 20, via electrodes 89, 89' of a solid state switching device 86 and a diode 74.

An optical or visual indicator, in the embodiment of FIG. 1 a green light 210, is provided between the source of DC current 16 and the solid state switching means 202 so that conductance of electrical current through the solid state switching means 202 activates the green visual indicator 210.

By activation of the optical coupler 195, electrical current is made available at sensing electrodes 212, 214 of a pair of solid state switching means 216, 218 respectively. The solid state switching means 216 is configured to drain electrical signals from a sensing electrode 204 of the solid state switching means 202 and thereby discontinue a flow of electrical current through the green visual indicator 210. The solid state current switching means 218 is configured to conduct electrical current from the source of DC voltage 16 through the solid state switching means 218, the diode 208, the electrodes 89, 89' of the solid state switching means 86, and the diode 74 to ground 20. A red visual indicator or optical indicator 220 is positioned between the source of DC current 16 and the solid state switching means 218 and is activated as electrical current is conducted therethrough to ground 20.

Dynamic transient protection is provided employing zener diodes 230, 231 for the solid state devices 72, 72'. Transient clippers 232, 233 and 234 provide transient clipping capability in various portions of the circuit 14 in well-known manner. The transient clipping means 232-234 are configured to protect components of the circuits 10, 12 notwithstanding that certain of those components may be rated for voltages less than transient voltage spikes ordinarily anticipated as potentially being present in the circuits 10, 12.

Diodes 236, 236' are paired with zener diodes 238, 238' to pass transients present in the main power line to the loads 18, 18' as required by applying a sufficient electrical signal to the sensing electrodes 32 to at least partially establish conductance through the solid state devices 30 until passage of the transient through the zener diodes 230, 231 can function via the solid state devices 72, 72' to apply the activating electrical signal to the sensing electrodes 32.

In use, the timer-controller 14 is activated by the initiation of electrical current flow therethrough by closing the switch 76. The oscillator-timer 110 is thereby activated to provide timing signals to the sequencer 112. The sequencer 112 alternately applies activating electrical signals to the solid state switching means 142, 142' and thereby through the optical couplers 72, 72' which alternately activate sets of the electrical current switching means 30 by means of application of the activating electrical signal to the sensing electrode 32 thereof.

Electrical current flow through the current transferring solid state means 30 to the loads 18, 18' from the source of DC voltage 16 thereupon commences, alternating between the loads 18, 18' depending upon whether activating electrical signals are available at the electrode 134 or 136. A voltage differential arises by operation of the load circuit 10 and the shunt 42. This voltage differential is perceived at the amplifier 152, amplified and the amplified voltage differential is made available to the comparators 160, 172, 174. The comparator 160 determines whether the amplified voltage differential exceeds an upper limitation, an indication of a short circuit in one of the loads 118, 118', and if the amplified voltage differential exceeds the upper limitation, the optical coupler 82 is activated to apply an initiating electrical signal to the sensing electrode 62 of the current switching means 60 in the interlock section 58. Activation of the solid state switching means 60 crow-bars the load circuit 10 to an off-state by draining electrical current from the sensing electrodes 32.

Where the amplified voltage differential lies between an upper voltage limitation at the comparator 172 and a lower voltage limitation at the comparator 174, the green visual indicator 210 is illuminated employing the solid state switching means 202. When the upper or lower current limitations are exceeded, the red visual indicator 220 is activated through the solid state current switching means 218. The current switching means 216 crow-bars current switching means 202 to turn off the green visual indication 210.

The DC-DC converter portion 52 provides electrical current at elevated voltage for use by the amplifier 152, the comparators 160, 172, 174 and for activating the current transferring means 30. The solid state switch 144 serves to inhibit electrical current through optical coupling devices 72, 72' virtually instantaneously when the circuit 50 is deactivated by dint of opening switch 76.

While four current transferring means 30 have been shown as applying electrical current to each load 18, 18', depending upon the sizing and selection of both the loads 18, 18' and the current transferring means 30, less than four or greater than four may be required. That is the particular current (amperes) being conducted to the load can have a determining effect upon the number of current transferring means 30 required to effectuate and implement the invention.

It should be apparent that the sequencer, while depicted in FIG. 1 as sequencing between two loads 18, 18' can be configured to sequence among a greater number of loads in like or similar manner.

In the circuit of FIG. 1, typically the current switching means 142, 142', 144, 202, 216, 218, 86, and 101 are IRFD120 Fet transistors or the like. Typically the voltage regulating means 107 is a PNP transistor. The comparators 160, 172, 174 and the amplifier 152 can be of any suitable or conventional nature and typically are LM124J operational amplifiers or the like. The current switching means 60 is typically a so-called silicon control rectifier (SCR).

It should be apparent that various modifications may be made to the timer-controller of the instant invention without departing the spirit and scope of the claims that follow. Particularly, but not limitingly, the current transferring means 30 can be configured to apply electrical current to a coil associated with an electro mechanical relay (not shown) with the electro mechanical relay being configured to conduct electrical current between source of DC voltage 16 and loads 18, 18'.

What I claimed is:

1. A timer-controller configured to apply electrical current to at least one individual load in a timed, where desired sequential manner comprising:
  (a) a load circuit configured to transferingly apply electrical current from a source to the individual loads;
  (b) a control circuit configured to cause the application of the electrical current through the load circuit;
  (c) in the load circuit at least one solid state switching means associated with each individual load within the load circuit;
  (d) voltage differential inducing means within the load circuit but separate from the individual loads configured for detecting a relative magnitude of electrical current flowing to a particular individual load while electrical current is applied thereto, amplifier means configured to respond to and amplify the voltage differential, comparator means configured to compare an amplified voltage differential provided by the amplifier means to an upper limitation thereon and to provide an initiating electrical indication to the crow-bar means while the amplified voltage differential exceeds the upper limitation, the electrical indication being configured to initiate a termination of electrical current flow to the particular individual load where the magnitude of the electrical current flow associated with the particular individual load undesirably so deviates from the desired magnitude;
  (e) solid state crow-bar means including a resetting means, the crowbar means being configured to latchingly terminate application of electrical current to the particular individual load in response to the initiating electrical indication;
  (f) a source of current at elevated voltage configured and operably connected to provide a desired current flow at a voltage in excess of a voltage supply available to the load circuit, together with a pair of comparators, one of the comparators being configured and operably connected to compare the amplified voltage differential to an upper voltage value, and where the amplified voltage differential exceeds the upper voltage value, configured and operably connected to provide an activating electrical signal, the remaining comparator being configured and operably connected to compare the amplified voltage differential to a lower voltage value and where the amplified voltage differential does not exceed the lower voltage limitation being configured and operably connected to provide an activating electrical signal, the source of electrical current at elevated voltage being configured to supply electrical current at an elevated voltage to at least one of the comparators; and (g) solid state timing means configured to produce activating electrical signals operably connected for activating the solid state switching means and thereby effecting application of the electrical current to each individual load in sequence for a desired time period.

2. The timer-controller of claim 1, the circuits being joined by solid conductors.

3. In the timer-controller of claim 1, at least one solid state component thereof being susceptible to voltage transients within the circuits, and the timer-controller including at least one transient clipping means or dynamic transient handling means.

4. In the timer-controller of claim 1, the solid state switching means being at least one field effect transistor each having a sensing electrode and configured to complete the load circuit in applying electrical current from the source thereof to particular individual loads within the load circuit while the activating electrical signal is present at the sensing electrode.

5. The timer-controller of claim 1 further including means configured to apply the elevated voltage to activate the at least one solid state switching means associated with each individual load within the load circuit.

6. The timer-controller of claim 1, the crow-bar means including a solid state switching conductor having a sensing electrode and configured to latchingly drain activating electrical signals from sensing electrode of the solid state switching means and further configured to be activated by application of the initiating electrical indication from the detecting means to the sensing electrode of the solid state switching conductor, together with a means for resetting the crow-bar means.

7. The timer-controller of claim 1, the solid state timing means including a solid state oscillator-timer and a solid state sequencer, the oscillator-timer configured to generate electrical timing signals and the sequencer configured to respond to the electrical timing signals by the production of the activating electrical signals configured to sequence the application of electrical current through each solid state switching means for desired periods of time.

8. The timer-controller of claim 1 further including a visual indication of the operating status of at least one of the load and control circuits, the visual indication being operably responsive to the activating electrical signal.

9. The timer-controller of claim 1 further including optical coupling means controlling application of the elevated voltage to the sensing electrode of the solid state switching means in the load circuit.

10. A solid state timer-controller configured to apply electrical current to at least one individual load in a timed, where desired sequential manner comprising:

(a) a load circuit configured to apply electrical current from a source of electrical potential to particular individual loads and including therein a resistance means between the source and the particular individual loads configured to introduce a measurable voltage differential proportional to current flow through the loads;

(b) a control circuit configured to produce activating electrical signals, operably connected to cause thereby the application of electrical current through the load circuit sequentially to the particular individual loads contained within the load circuit for desired time periods;

(c) at least one solid state electrical current switching means including a sensing electrode associated in the load circuit with each particular individual load, the solid state switching means being each operably connected for activation by the application of the activating electrical signal thereto through the sensing electrode thereof;

(d) a solid state amplifier configured to provide an amplification of the voltage differential and a first solid state comparator operably connected to the amplifier in a configuration whereby the first comparator compares the amplified voltage differential to a predetermined value, and where this amplified voltage differential exceeds the predetermined value, to provide an initiating electrical indication;

(e) second and third comparators, the second comparator being configured and operably connected to compare the amplified voltage differential to an upper voltage value, and where the amplified voltage differential exceeds the upper voltage value, configured and operably connected to provide an activating electrical signal, the third comparator being configured and operably connected to compare the amplified voltage differential to a lower voltage value and where the multiplied voltage differential does not exceed the lower voltage limitation being configured and operably connected to provide an activating electrical signal;

(f) a solid state crow-bar means operably connected to the load circuit solid state switching means and configured to terminate latchingly the flow of electrical current to a particular individual load in response to the initiating electrical indication, the crow-bar means being configured to drain latchingly the activating electrical signals from the solid state switching means in the load circuit to terminate electrical flow therethrough;

(g) a resetting means configured and operably connected to deactivate the crow-bar means by terminating electrical current flow therethrough; and (h) a solid state oscillator timer together with and in operable connection with a solid state sequencer, the timer being configured to provide electrical timing signals to the sequencer at desired intervals as determined by the oscillator-timer and the sequencer being configured to receive the electrical timing signals from the oscillator-timer and configured and operably connected to initiate thereupon the activating electrical signals configured to apply, sequentially, electrical current through the solid state switching means in the load circuit to the particular individual loads within the load circuit;

the oscillator-timer being further configured and operably connected to provide still further electrical signals to the resetting means.

11. The timer-controller of claim 10, further including an optical coupling means configured and operably connected to be activated by the initiating electrical indication from the comparator and to apply the initiating electrical indication to the crow-bar means.

12. The timer-controller of claim 10, further including an optical coupler configured and operably connected to be activated by an activating electrical signal provided from either of the second or third comparators and further being configured and operably connected to originate an electrical output for activating the visual indicator.

13. The timer-controller of claim 12, further including at least one dynamic transient handling means or transient clipper configured and operably connected to attenuate transients in at least one of the control circuit and load circuit.

14. In the timer-controller of claim 12, the load circuit and the control circuit being operably joined one to the other through the use of solid current conductors.

15. In the timer-controller of claim 12, the source of electrical current at elevated voltage being a DC-DC converter.

16. The timer-controller of claim 12, the individual loads being electrothermal de-icers.

17. The timer-controller of claim 10, the individual loads being electrothermal de-icers.

18. The timer-controller of claim 10 further including a source of electrical current at elevated voltage, the source configured to supply electrical current at an elevated voltage to at least one of the comparators and to the sensing electrode of the solid state switching means associated in the load circuit with each particular individual load.

19. The timer-controller of claim 10 further including optical coupling means controlling application of the activating electrical signal to the sensing electrode of the solid state switching means in the load circuit.

20. In circuits configured to apply an electrical current, sequentially, to individual loads within a load circuit, the load circuit being configured to collect electrical current from a source and to apply the electrical current to individual loads, with the load circuit being controlled by a control circuit configured to cause application of the electrical current through the load circuit, a method including the steps of:
  (a) operably connecting in sequence and for a desired time period, the source and each of individual loads in the load circuit employing at least one solid state switching means associated with each individual load within the load circuit;
  (b) detecting the magnitude of electrical current flowing to a particular individual load while current is applied thereto and introducing a voltage differential in line in the load circuit but separate from the particular individual load, the voltage differential being representative of magnitude of the electrical current flowing to the particular individual load, comparing a signal representing the voltage differential to a first upper limitation thereon, and providing an initiating electrical indication and thereby initiating termination of electrical current flow to the particular individual load where the magnitude of electrical current flow associated therewith undesirably deviates from the desired maximum magnitude;
  (c) employing a solid state crow-bar means, latchingly crow-barring to terminate a flow of electrical current to the particular individual load in response to the initiating electrical indication and periodically resetting the crow-bar function;
  (d) comparing a signal representing the voltage differential to a second upper voltage limitation and where a signal representing the voltage differential exceeds the second upper voltage limitation providing an activating electrical signal;
  (e) comparing a signal representing the voltage differential to a lower voltage limitation and where a signal representing the voltage differential does not exceed the lower voltage limitation providing an activating electrical signal; and
  (f) providing a source of electrical current at a voltage in excess of a voltage supply available to the load circuit and employing the elevated voltage in making the comparison between a signal representing the voltage differential and the upper voltage limitation.

21. In the method of claim 20, the additional step of operably connecting the circuits employing solid conductors.

22. The method of claim 20, including the step of providing and operably connecting transient handling or clipping means within at least one of the circuits.

23. In the method of claim 20, the step of providing the solid state switching means to be at least one field effect transistor, activatable employing actuating electrical signals to complete the load circuit in conducting electrical current from a source thereof to particular individual loads within the load circuit.

24. The method of claim 20, including the steps providing electrical timing signals within the control circuit, and employinq the electrical timing signals, sequencing application of electrical current to each solid state switching means for desired periods of time.

25. The method of claim 20, including the step of providing a visual indication of the operating status of at least one of the load and control circuits the visual indication being operably connected and responsive to an activating electrical signal.

26. The method of claim 20 further including employing the elevated voltage to activate the at least one solid state switching means associated with each individual load within the load circuit.

27. The method of claim 20, further including the step of optically controlling application of the elevated voltage to the sensing electrode of the solid state switching means in the load circuit.

28. In circuits employing a solid state timer-controller configured for sequential application of electrical current to individual loads, the individual loads being contained within a load circuit configured to apply electrical current from a source of electrical potential through the individual loads to a point of low reference voltage and including a control circuit configured to cause application of electrical current through the load circuit sequentially to individual loads contained within the load circuit for desired time periods, a method having the steps comprising:
  (a) employing a solid state electrical current switching means within the load circuit, transferring electrical current to individual loads and activating the solid state current switching means by application of an activating electrical indication to a sensing electrode thereof;
  (b) employing a resistance means configured for introducing a voltage differential between the source and the individual loads independent of the individual loads and comparing a signal representing the voltage differential to a predetermined voltage, and where the predetermined voltage is exceeded by the signal representing the voltage differential, providing an initiating electrical indication;
  (c) employing a solid state crow-bar means, latchingly draining the activating electrical indication from the solid state switching means in the load circuit to terminate electrical flow therethrough by activating the solid state crow-bar means in response to the initiating electrical indication;
(d) comparing a signal representing the voltage differential to an upper voltage limitation and where a signal representing the voltage differential exceeds the upper voltage limitation activating a visual signal;
(e) comparing a signal representing the voltage differential to a lower voltage limitation and where a signal representing the voltage differential does not exceed the lower voltage limitation activating a visual signal; and
(f) providing a source of electrical current at a voltage in excess of a voltage supply available to the load circuit and employing the elevated voltage in making the comparison between a signal representing the voltage differential and the upper voltage limitation;
(g) providing electrical timing signals from a solid state timer-oscillator and employing a solid state sequencer responsive to the electrical timing signals, providing in response to the electrical timing signals sequential application of the electrical current through the solid state switching means in the load circuit sequentially to the individual loads; and
(h) periodically resetting the crow-bar means.

29. The method of claim 28, including the step of optically coupling the source of initiating electrical indication to provide an optically transmitted initiating electrical indication to the crow-bar means.

30. The method of claim 28, further including the step of optically coupling the electrical signals resulting from comparison of a signal representing the voltage differential with the upper and lower voltage limitations with the visual indication.

31. The method of claim 30, further including the step of handling or clipping transients present in at least one of the circuits.

32. The method of claim 30, including the further step of operably joining the load and control circuit employing solid state conductors.

33. The method of claim 30, including the further step of utilizing a DC-DC converter as the source of current at an elevated voltage.

34. The method of claim 30, the individual load circuit including at least one electrothermal de-icer.

35. The method of claim 28, the individual load circuit including at least one electrothermal de-icer.

36. The method of claim 28 further including activating the solid state current switching means within the load circuit employing the elevated voltage.

37. The method of claim 28 further including the step of optically controlling application of the elevated voltage to the sensing electrode of the solid state switching means in the load circuit.

* * * * *